(No Model.) 3 Sheets—Sheet 1.
E. HESSE.
BAND CUTTER AND FEEDER.

No. 513,682. Patented Jan. 30, 1894.

Witnesses.
A. H. Opsahl.
Frank D. Merchant.

Inventor.
Ernest Hesse
By his Attorney.
Jas. F. Williamson (No Model.) 3 Sheets—Sheet 3.

E. HESSE.
BAND CUTTER AND FEEDER.

No. 513,682. Patented Jan. 30, 1894.

Witnesses.
A. H. Opsahl.
Frank D. Merchant.

Inventor.
Ernest Hesse
By his Attorney.
Jas. F. Williamson

UNITED STATES PATENT OFFICE.

ERNEST HESSE, OF HOLLYWOOD, MINNESOTA.

BAND-CUTTER AND FEEDER.

SPECIFICATION forming part of Letters Patent No. 513,682, dated January 30, 1894.

Application filed May 8, 1893. Serial No. 473,422. (No model.)

*To all whom it may concern:*

Be it known that I, ERNEST HESSE, a citizen of the United States, residing at Hollywood, in the county of Carver and State of Minnesota, have invented certain new and useful Improvements in Band-Cutters and Feeders; and I do hereby declare the following to be a full, clear, and exact description of the invention, such as will enable others skilled in the art to which it appertains to make and use the same.

My invention relates to band cutters and feeders, and has for its object to provide an improved machine of this class.

To this end, my invention consists in certain novel devices and combination of devices, which will be hereinafter fully described and defined in the claims.

A machine embodying my improvements, is illustrated in the accompanying drawings, wherein, like letters referring to like parts throughout the several views—

Figure 1:
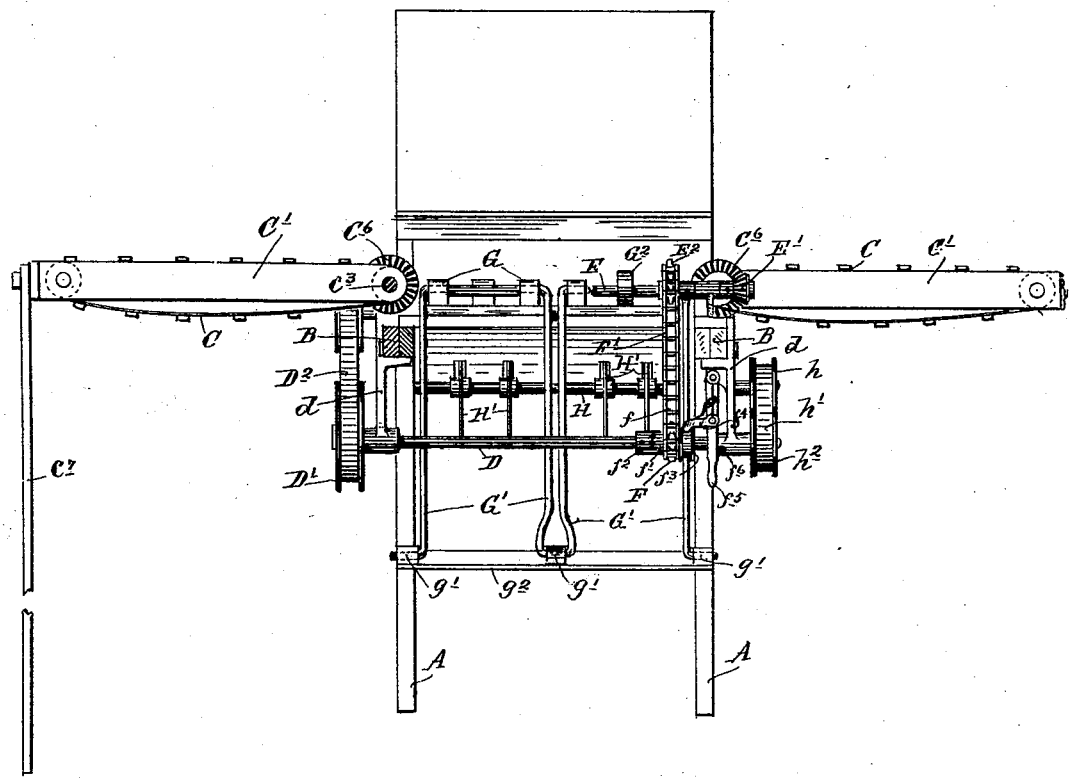
Figure 2:
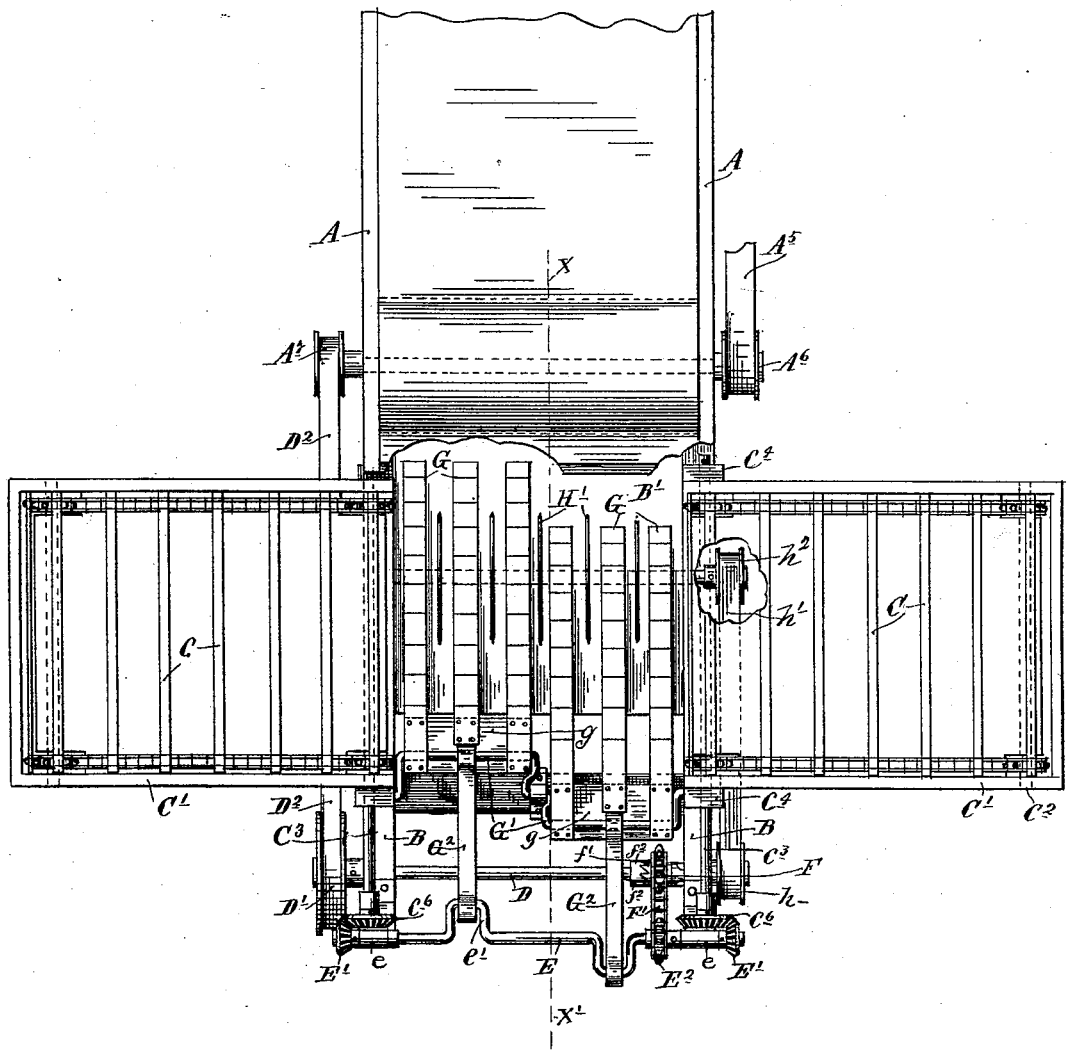
Figure 3:
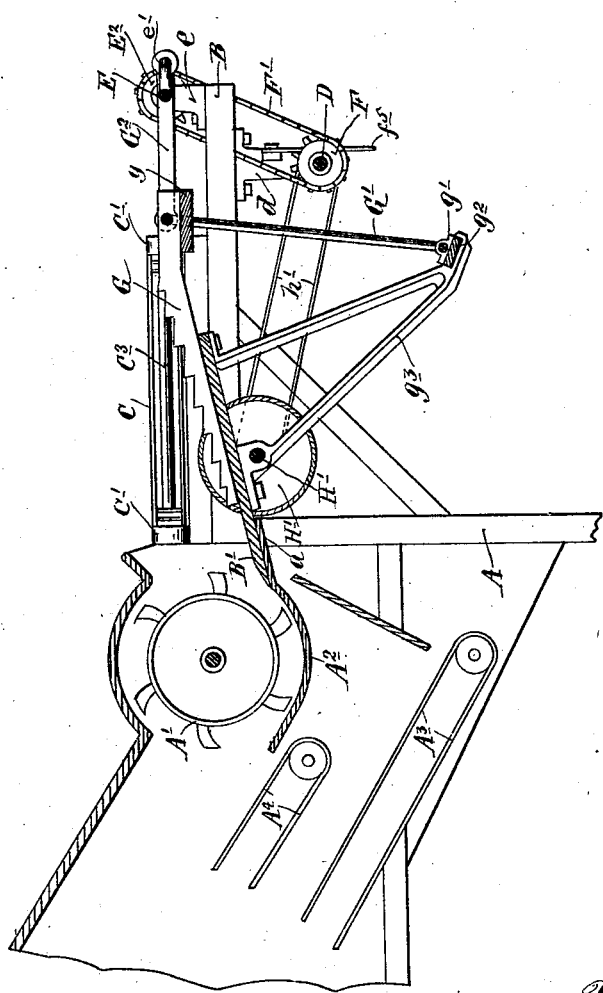

Figures 1 and 2 are views respectively, in front elevation and plan, showing the front end of a thrashing machine equipped with my band cutter and feeder attachment, some parts being broken away; and Fig. 3 is a vertical longitudinal section taken approximately on the section line X X' of Fig. 2.

A represents the separator frame, A' the thrashing cylinder, $A^2$ the concave, $A^3$ the grain belt, $A^4$ one of the separating belts, and $A^5$ the belt from the engine to the pulley $A^6$, on the right end of the cylinder shaft. All of the above mentioned parts are of the ordinary well-known construction.

B are side pieces forming the band-cutter and feeder frame, which are removably secured by nuts and bolts, or otherwise, to the side arms of the separator frame A; and B' is the combined feed-board and cutter-table rigidly secured to said side pieces B and overlapping a forwardly extended portion $a$ of the concave $A^2$.

C C are a pair of endless bundle carriers, as shown of the apron and slat variety, arranged laterally of the feeder frame, one at each side of the same, for supplying the uncut bundles. These carriers are supported by pivoted frames C' and work over sprocket wheeled shafts $C^2$ and $C^3$, mounted in said frame C'. Of these sprocket wheeled shafts, $C^2$ are the outer and idle shafts, and $C^3$ are the inner and driving shafts. The shafts $C^3$ project both to the front and to the rear and work through bearings $C^4$ and $C^5$, thus forming a pivot for the frames C'. To the forward ends of the shafts $C^3$ are secured a pair of bevel wheels $C^6$. The carrier frames C' are supported at their outer ends by loose or pivoted legs $C^7$.

D is a laterally disposed shaft, journaled in bearings $d$, depending from the frame pieces B. This shaft has, at its left end, a pulley D', and is driven from a driving pulley $A^7$, on the left end of the cylinder shaft, by a belt $D^2$ passing over said pulleys $A^7$ and $D^2$.

E is another laterally disposed crank shaft, journaled in bearings $e$, rising from the frame-timbers B, at their forward ends, and provided at its opposite ends with bevel pinions E', in engagement with the beveled wheels $C^6$.

$E^2$ is a sprocket wheel rigid on the shaft E, inward of the right end of the same.

F is a loose sprocket wheel, mounted on the shaft D, in line with the sprocket wheel $E^2$ on the shaft E, having freedom for an endwise sliding motion thereon, and provided with a half clutch $f'$ normally held in engagement with another half clutch $f^2$ rigid on the said shaft D. The sprocket wheel F has also, at its right side, a grooved hub $f^3$, in the groove of which works the free end of a spring-held shipper-fork $f^4$, carried by a pivoted shifting lever $f^5$, depending from the right bearing bracket $d$. This lever $f^5$ is adapted to be given a slight spring forward so as to pass a short lock-pin $f^6$, projecting forward from the right bearing $d$. This pin $f^6$ serves, by its engagement with the free end of the lever $f^5$, to hold the half clutch of the sprocket wheel F either in, or out of engagement with the constantly running half clutch $f^2$, as may be desired.

F' is a sprocket chain passing over the sprocket wheels $E^2$ and F.

G are a pair of reciprocating feed plungers adapted to receive the uncut bundles from the endless carriers C, to feed the same to the band cutters (as will presently appear); and from thence, to continue the feed movement of the loose grain, from the band cutters to the cylinder A'. Each of these feed plungers is made in the form of a series of serrated or stepped prongs, (as shown, three prongs) working with their free inner ends on the band cutter table B', and secured together at their outer front ends by a head or cross board g. At their outer ends, the said plungers are pivotally supported and carried by independently movable bail-like links G'. These bails G' have their feet pivoted in bearings $g'$, secured on a cross slat $g^2$, which is supported by a pair of brackets $g^3$ depending from the bottom of the band-cutter table B'. The cranks $e'$ on the crank shaft E, are preferably set one hundred and eighty degrees apart.

$G^2$ are pitmen, carried by the said cranks $e'$ and having their inner ends pivotally secured on the upper cross portions of the bails G'. As shown, these pitmen engage the cross portion of the bails G, at a point central thereof, and are adapted to bear against the ends of the central members of the prongs of the plungers, in the action of feeding the bundles, thus taking the strain from the bails.

H is the band cutter shaft journaled in the depending brackets $g^3$, immediately under the combined cutter and feed table B', and provided with a series of rotary cutters H', which project through slots cut in said table B'. As shown, these cutters H' are five in number and are positioned to work, one between each of the serrated prongs of the feed plungers G. These cutters H' are given their rotary motion from a pulley $h$, carried at the right end of the shaft D, through a belt $h'$ passing over another pulley $h^2$, rigid on the right end of the cutter-shaft H.

The driving connections from the cylinder A' to the cutters H' are such, that said cutters will be rotated against the feed movement of the feed plungers. This is desirable, as it increases the cutting action of the cutters.

The operation is obvious:—The thrashing mechanism being started, the band cutting and feeding mechanism will be driven, as already indicated. The bundles are thrown onto the endless carriers C and are fed onto the feed plungers G, from both sides or either side of the machine. The plungers, acting in alternate order, will feed the bundles delivered from their respective endless carriers C, in alternate succession to the cutters H'; and will continue the feed of the loose grain, after the bundles are cut, to the thrashing cylinder A'. In virtue of the fact, that the frames C' supporting the endless carriers C, are pivoted on their driving shafts $C^3$, the said carriers and frame may be folded or turned up over the top of the machine, in passing between stacks or through other narrow passages, or for travel on the road. In virtue of the pivotal attachment of the feed plungers G to the bail-links G', the said feed plungers may be readily turned forward out of their operative positions, to give access to the feed cylinder and the cutters.

As is obvious, by means of the construction already fully described, in connection with the loose-sliding sprocket wheel F, the said sprocket wheel may be thrown into and out of gear with the shaft D, by means of the shifting lever $f^5$; thus rendering the action of the plungers G and endless carriers C active, or inactive, at will.

It will be understood, of course, that various alterations, in the details of construction of my band-cutter and feeder, as herein shown, might be made without departing from the spirit of my invention.

What I claim, and desire to secure by Letters Patent of the United States, is as follows:

1. A band-cutter and feeder having a pair of pronged and serrated feed-plungers, means for reciprocating said feed plungers in alternate order, rotary band-cutters working between the prongs of said feed plungers, and means for rotating said rotary cutters against the feed movement of said feed plungers, substantially as and for the purpose set forth.

2. In a band cutter and feeder, the combination with the reciprocating serrated feed plungers, of the bail-links, having their bail ends pivoted to said feed plungers and their pronged ends pivoted to the framework, the pitman-carrying crank-shaft, and the pitmen, carried from said crank shaft and having their extended ends pivoted on the bail portion of said bail-links, substantially as and for the purpose set forth.

3. In a band-cutter and feeder, the combination with the lateral bundle carriers, having the driving shafts forming pivots for said carriers and provided at one of their projecting ends with beveled wheels, of the reciprocating pronged and serrated feed plungers pivotally carried at their forward ends by pivoted links, the crank shaft provided with beveled pinions engaging the beveled wheels on the bundle carriers' driving shaft, links from the cranks of said crank-shaft to said feed plungers, rotary band cutters working between the prongs of said feed plungers, and intermediate driving mechanism to said cutters and the crank shafts from the thrashing mechanism, substantially as described.

4. In a band cutter and feeder, the combination with the bundle carriers C, having the driving shafts $C^3$ provided with the beveled pinions $C^6$, of the reciprocating pronged feed plungers G, working with their free inner ends on the cutter-table B' and supported at their outer ends by the bails G'; the cutters H', on the shaft H, working beween the prongs of the feed plungers G; the shaft D provided with the rigid half clutch $f^2$, and the loose sprocket wheel F having the half clutch $f'$ and the grooved hub $f^3$; the shipper fork $f^4$ carried by the shifting lever $f^5$ and engaging the groove of said grooved hub $f^3$; the crank shaft E having the cranks $e'$ connected by pitmen $G^2$ to said feed plungers, and provided with the beveled pinions $E'$ engaging the said beveled wheels $C^6$, and means for imparting motion to said shafts H and D, substantially as described.

In testimony whereof I affix my signature in presence of two witnesses.

ERNEST HESSE.

Witnesses:
F. W. VAN KREVELEN,
WM. WYE.